United States Patent [19]

Alday et al.

[11] Patent Number: 5,599,365
[45] Date of Patent: Feb. 4, 1997

[54] MECHANICAL FLUID SEPARATOR

[75] Inventors: John H. Alday, Charlotte; Richard L. Dishman, Jr.; Mark E. McConnell, both of Huntersville; William D. Wright, Jr., Charlotte, all of N.C.

[73] Assignee: Ingersoll-Rand Company, Woodcliff Lake, N.J.

[21] Appl. No.: 398,260

[22] Filed: Mar. 3, 1995

[51] Int. Cl.⁶ .................................................. B01D 45/00
[52] U.S. Cl. ........................... 55/426; 55/458; 55/459.1; 55/463; 95/271; 96/189; 96/209
[58] Field of Search ............................. 55/307, 331, 336, 55/337, 391, 426, 458, 459.1, 463; 95/262, 261, 271; 96/189, 209, 212, 216, 220

[56] References Cited

U.S. PATENT DOCUMENTS

| | | |
|---|---|---|
| 1,856,685 | 5/1932 | Anderson . |
| 2,230,453 | 2/1941 | Fitch ......................................... 55/337 |
| 2,616,563 | 11/1952 | Hebb . |
| 2,672,215 | 3/1954 | Schmid . |
| 2,999,563 | 9/1961 | Wehn et al. . |
| 3,483,677 | 12/1969 | Pinto ......................................... 55/337 |
| 3,504,804 | 4/1970 | Newman et al. . |
| 3,695,007 | 10/1972 | Farnworth ................................. 55/337 |
| 3,802,570 | 4/1974 | Dehne . |
| 3,898,068 | 8/1975 | McNeil . |
| 3,953,184 | 4/1976 | Stockford et al. . |
| 4,001,121 | 1/1977 | Bielefeldt . |
| 4,268,288 | 5/1981 | Coombs ..................................... 55/337 |
| 4,900,339 | 2/1990 | Ward et al. ................................ 55/337 |
| 5,080,697 | 1/1992 | Finke ......................................... 55/337 |

FOREIGN PATENT DOCUMENTS

| | | | |
|---|---|---|---|
| 1070667 | 1/1980 | Canada ..................................... 55/331 |
| 708415 | 7/1941 | Germany ................................... 55/337 |
| 828317 | 7/1949 | Germany ................................... 55/337 |
| 52-44060 | 4/1977 | Japan ........................................ 55/337 |

*Primary Examiner*—C. Scott Bushey
*Attorney, Agent, or Firm*—John J. Selko; Michael M. Gnibus

[57] ABSTRACT

A mechanical fluid separator defines an interior chamber for centrifugally separating entrained media from a fluid stream. The mechanical fluid separator has a fluid inlet connecting the interior chamber with a media entrained fluid source. A cone shaped baffle disposed within the mechanical fluid separator defines a conical surface having a concave surface and a convex surface. The conical surface has an annular base side and an annular apex side. The base side terminates in a circumferential rim contacting the annular chamber surface above the fluid inlet and said apex side terminates in an apex annular hole. The fluid stream is centrifugally directed in a first direction about the annular chamber surface and the convex surface of the conical baffle to disentrain the entrained media from the fluid stream. The disentrained fluid stream then passes through a window in the cone shaped baffle and escapes through a fluid outlet.

14 Claims, 4 Drawing Sheets

5,599,365

MECHANICAL FLUID SEPARATOR

BACKGROUND OF THE INVENTION

The present invention relates to a method and apparatus for separating liquid and particulate matter from a gaseous fluid. More particularly, the present invention relates to a method and apparatus for inducing a centrifugal flow in the gaseous fluid, wherein a scrubbing action of the liquid and particulate matter with a scrubbing plane allows separation from the gaseous fluid.

Mechanical fluid separators or "cyclone type" separators are well known in the art for separating liquid and particulate matter from a gaseous fluid or fluid stream. Mechanical fluid separators work well with mixed media, i.e., entrained media such as gas/solid, gas/liquid, or gas/solid/liquid combinations. For brevity, entrained media shall refer to both particulate matter (solid matter) and liquid matter as described herein.

Mechanical fluid separators have found a wide range of uses from reducing dust particles and contaminants in an office environment to removing saw dust, wood Chips, and metal filings in an industrial complex. Fluid separators are generally incorporated into systems which include other process machinery. Fluid separators are thus subject to abundant vibration induced by the other process machinery. It is therefore beneficial for fluid separators to incorporate features which inherently diminish the effect of such vibration. It is also beneficial for the fluid separators to withstand a vibration prone environment while resisting resonant vibration and mechanical stresses. Such features reduce noise and provide greater reliability.

Mechanical fluid separators generally induce a centrifugal flow with the heavier entrained media scrubbing a circumferential wall of the vessel. The heavier media then drain down to a sump through gravity while the gaseous fluid continues about a predetermined path. Since the entrained matter is generally heavier than the gaseous fluid, it is drawn toward the sides of an annular vessel. As the entrained matter scrubs against the sides of the vessel, it becomes separated from the fluid and falls downwardly to a container through the force of gravity. Prior examples of mechanical fluid separators include McNeil, U.S. Pat. No. 3,898,068 and Bielefeldt, U.S. Pat. No. 4,001,121. However, to accomplish the required features, the mechanical fluid separator have incorporated a complicated shape which requires substantial steps during manufacture.

SUMMARY OF THE INVENTION

It is therefore an object of the invention to provide a mechanical fluid separator which induces a centrifugal flow while maximizing scrubbing surface area relative to vessel height and circumference. It is another object of the invention to minimize fluid velocity and provide resistance to vibration. Another object of the invention to is improve ease of manufacture and reliability through a single piece baffle while providing an inherently high stiffness relative to material properties and thickness. The single piece baffle is optimized for shape, area and placement to maximize the disentrainment of media from a fluid stream. An annular hole in the lowest point of the baffle assists in drainage of the solid or liquid media from the fluid stream.

A mechanical fluid separator defines an interior chamber for centrifugally separating entrained media from a fluid stream. The mechanical fluid separator has a fluid inlet connecting the interior chamber with a media entrained fluid source. An annular chamber surface defines an interior of the interior chamber.

The fluid separator has a cone shaped baffle defining a conical surface having a concave surface and a convex surface. The conical plane has an annular base side having a base side circumferential length and an annular apex side having an apex side circumferential length. The base side terminates in a circumferential rim contacting the annular chamber surface above the fluid inlet and said apex side terminates in an apex annular hole.

The apex side circumferential length of the cone shaped baffle is less than said base side circumferential length. A fluid outlet connects the interior chamber of the mechanical fluid separator with a fluid outlet passage above the cone shaped baffle. The cone shaped baffle further defines a fluid passage between the concave surface and the convex surface such that the fluid stream passes through fluid passage to exit though the fluid outlet.

The fluid inlet is a tubular member protruding into and out of the interior chamber of the mechanical fluid separator. The fluid inlet has an elbow shape upon entrance into the interior chamber for determining a path of centrifugal rotation of the fluid stream. The fluid inlet terminates in a fluid inlet orifice for directing the fluid stream in a first direction about the annular chamber surface. The fluid passage of the cone shaped baffle is disposed about the cone shaped baffle in a rotational position opposite the first direction of the fluid inlet such that the fluid stream is directed over half of the interior circumferential distance of the annular chamber surface before entering the fluid passage.

The circumferential rim of the base side of the conical baffle includes a flexible ridge for uniformly contacting an annular chamber surface having a variable eccentricity. The fluid passage has a top side, a bottom side, a right side and a left side, wherein the top side has a greater length than the bottom side. The right side and the left side are equal length. The top side and the bottom side each have a radial length concentric with an arc extending about the annular base side. The arc is about ninety degrees.

The mechanical fluid separator further incorporates means for defining a path of centrifugal rotation of the fluid stream about the annular chamber surface and the convex side of said cone shaped baffle. Means as shown supply the mechanical fluid separator with a media entrained fluid and connects the interior chamber of the mechanical fluid separator with a fluid outlet passage. A cone shaped baffle then defines a conical surface. Said conical plane defines an annular base terminating in a circumferential rim, with said circumferential rim contacting the annular chamber surface between the means for supplying the entrained fluid and the means for connecting to the outlet passage. Means then scrub the entrained media from said fluid stream to form an unentrained fluid stream. The unentrained fluid stream passes through the cone shaped baffle then exits through the fluid outlet.

The aforementioned and other objects, features, and advantages of the present invention will become subsequently apparent from the following description of the preferred embodiments, as well as from the associated drawings, all of which merely illustrate the inventive concept, and are in no way intended, nor should be construed, to limit the scope of the instant invention.

DESCRIPTION OF THE PREFERRED EMBODIMENTS

Figure 3:
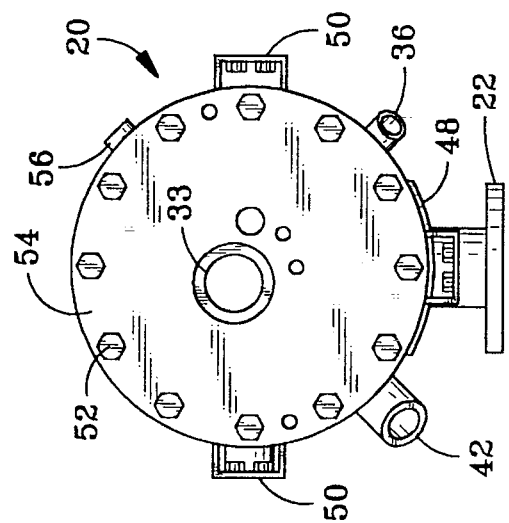
FIG. 3 is a top view of the present invention.
Figure 1:
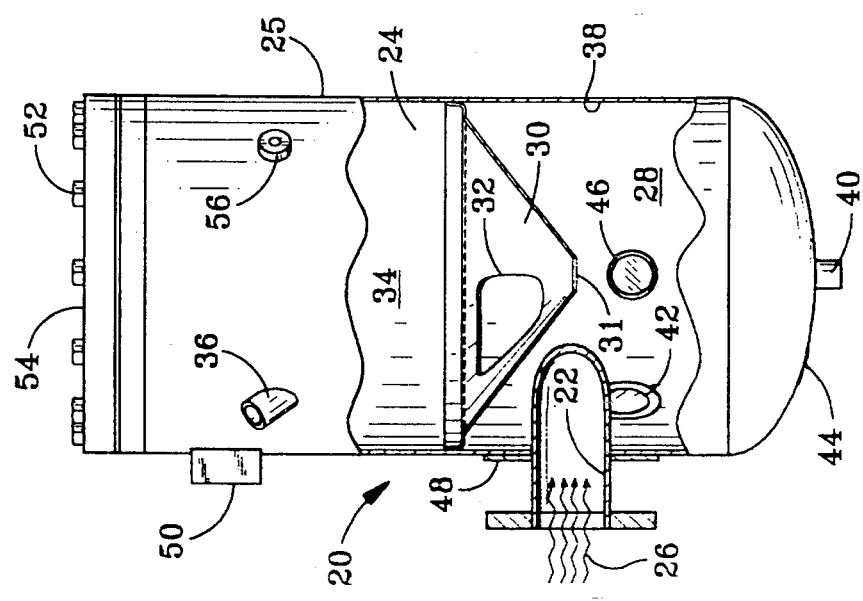
FIG. 1 is a side view and partial sectional view of an embodiment of the present invention.

Turning now to the drawings and more particularly to FIG. 1, where like numerals denote like components, a mechanical fluid separator 20 according to the present invention is shown. A partial cutaway view shows a fluid inlet 22 for connecting main tank 25, having interior chamber 24, with a media entrained fluid 26. The fluid 26 may be entrained with particulate matter, liquid, or combinations of both to varying degrees. The gaseous fluid need not be of the same chemical composition as the media, Fluid 26 first enters the lower section 28 of interior chamber 24 and encircles cone shaped baffle 30. Fluid 26 next passes through a window or fluid passage 32 of cone shaped baffle 30 and continues into upper section 34 of mechanical fluid separator 20. The media entrained fluid 26 is then relieved of the entrained media as it passes through cone shaped baffle 30. Cone shaped baffle 32 includes an apex annular hole 31 so that media escaping through fluid passage 32 may escape from upper section 34 to lower section 28. The unentrained fluid then escapes through fluid outlet 33 (as shown in FIG. 3). Pressure relief valve 36 is provided to prevent excess build up of fluid in upper section 34 of main tank 25.

As the fluid 26 enters fluid inlet 22, the entrained media is evenly dispersed about the fluid mixture. However, as the fluid is forced to turn about a circular rotation within lower section 28 of the mechanical fluid separator, the entrained media is forced to the interior wall or annular chamber surface 38. The entrained media then scrubs against annular chamber surface 38 and cone shaped baffle 30 and becomes disentrained from fluid 26. Gravity then forces the disentrained media down the annular chamber surface 38 for eventual release through tank drain 40.

To reduce reentrainment of the particulate matter or fluid, oil may be included within the bottom of main tank 25. Oil enters main tank 25 through oil fill 42 and may be drained through oil outlet 44. A visual inspection by way of sight glass 46 enables the operator to determine if the correct coolant level is being maintained. If the correct level is not being maintained, corrective action is taken.

Figure 2:
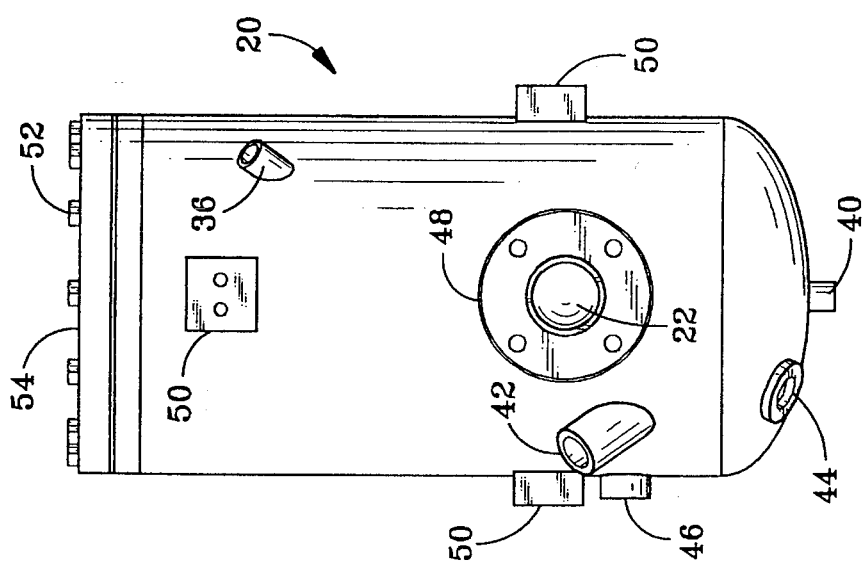
FIG. 2 is a side view the present invention.
Figure 5:
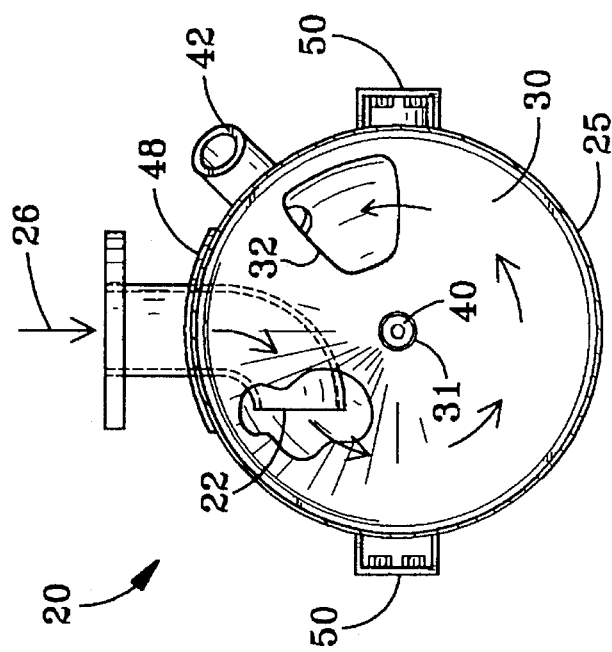
FIG. 5 is a sectional view taken along line V—V of FIG. 4.
Figure 4:
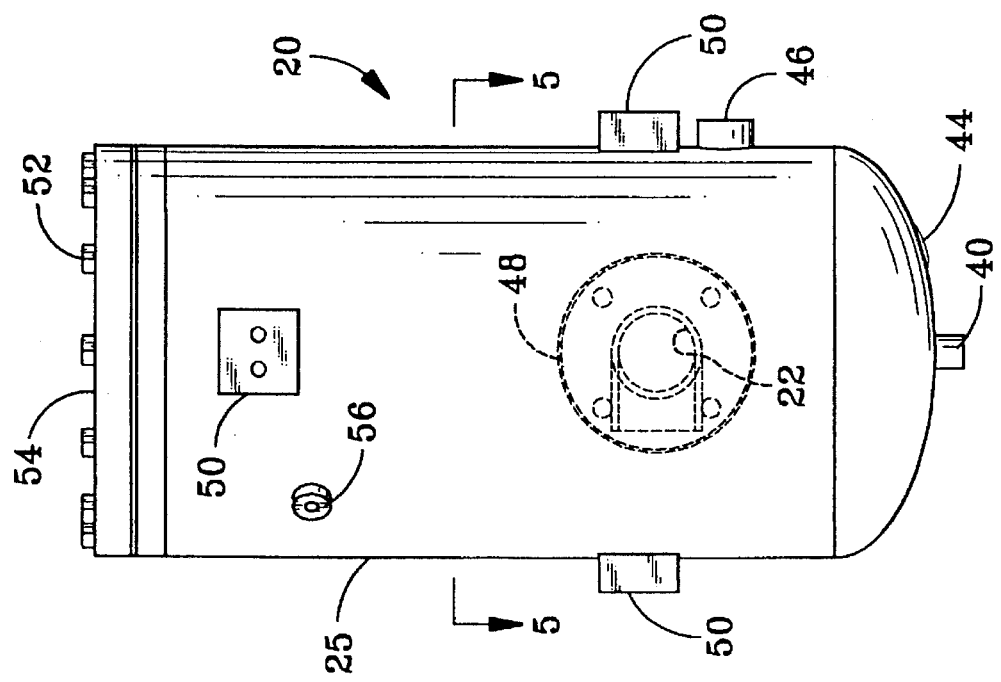
FIG. 4 is a side view of the present invention shown from the opposite side from FIG. 2.

Referring now to FIGS. 1 and 5, it is shown that fluid inlet 22 has a curved or elbow configuration upon entry into the main tank 25. The curved elbow configuration helps to direct the fluid flow as shown in the sectional view of FIG. 5. As the fluid enters mechanical fluid separator 20 the direction is perpendicular to the main body 25. However, upon manipulation by the curved elbow configuration the fluid flow is diverted tangential to main body 25. Alternatively, it would be equivalent to have inlet 22 enter main tank 25 tangentially. Next, the media entrained fluid 26 encircles annular chamber surface 38 before reaching fluid passage 32 in cone shaped baffle 30. Referring now to FIGS. 1, 2 and 4, fluid inlet 22 is attached to main tank 25 through inlet weld flange 48. Attachment brackets 50 secure the main tank 25 of the fluid separator to a supporting structure or surrounding equipment. For added support, main tank weld flange 56 is also provided.

Referring now to FIGS. 1 and 3 a top view of the mechanical fluid separator 20 is shown. A plurality of bolts 52 secure top cover 54 to main tank 25. Fluid outlet 33 is disposed on the top of the mechanical fluid separator 20. Placement of fluid outlet 33 at the highest location maximizes the potential gravitational effect on entrained matter which was not separated through the fluid passage 32 of cone shaped baffle 30. If such entrained matter should become disentrained in the upper section 34, gravity will force the matter downward and out through apex annular hole 31 and into lower section 28.

Figure 7:
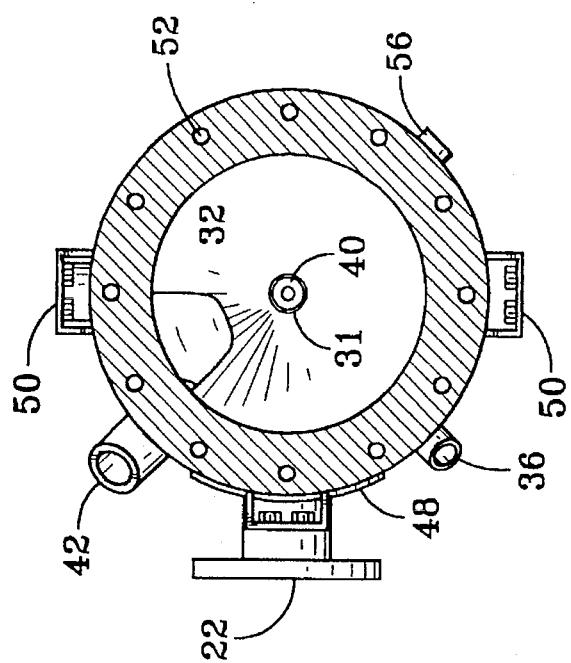
FIG. 7 is a sectional view shown along line VI—VI of FIG. 6.
Figure 6:
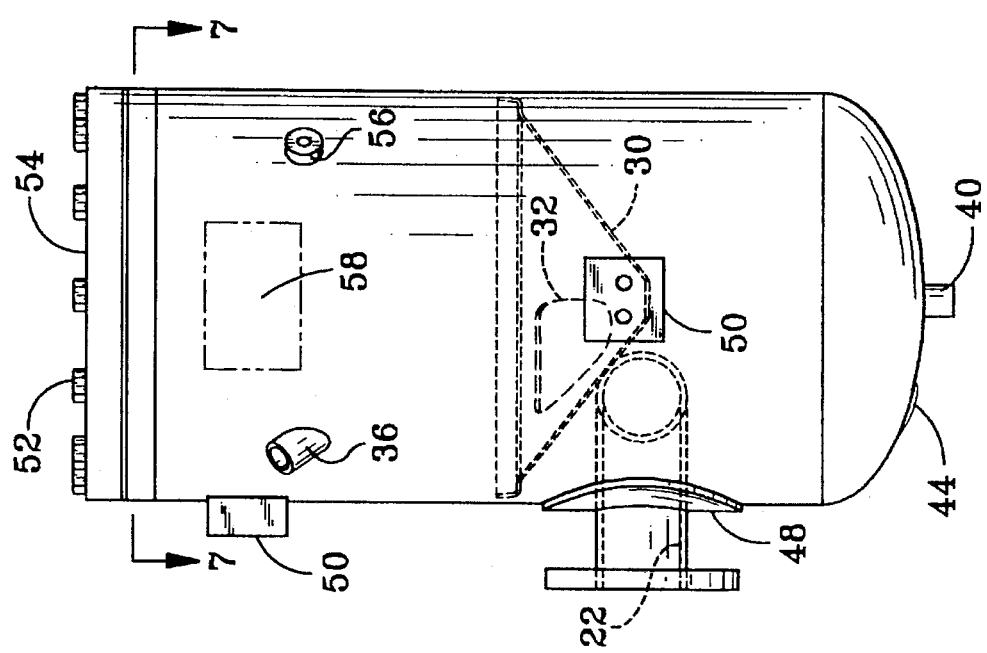
FIG. 6 is side view shown with a 90 degree rotation from FIG. 2.

FIGS. 6 and 7 show respective side and sectional views of mechanical fluid separator 20. FIG. 6 shows that code section 58 may be provided to detail imprinted material on the mechanical fluid separator such as product source and building code information.

Figure 10:
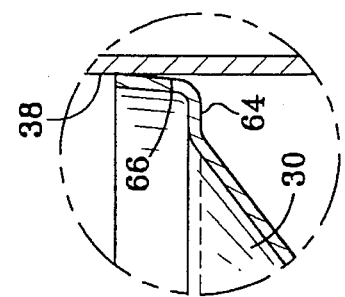
FIG. 10 is an enlarged sectional view of a corner contact of the cone shaped baffle of FIG. 9 and the annular chamber surface.
Figure 8:
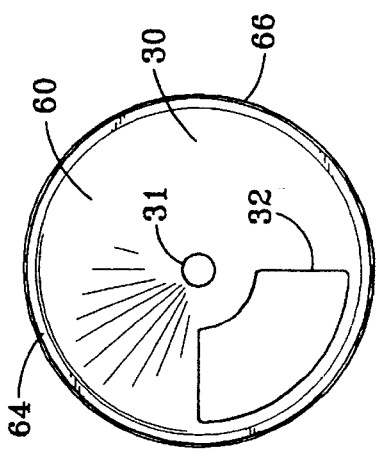
FIG. 8 is a top schematic view of the cone shaped baffle.
Figure 9:
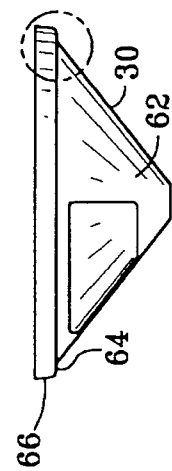
FIG. 9 is a side schematic view of the cone shaped baffle.

Referring now to FIGS. 8–10, a schematic representation of the cone shaped baffle 30 is shown. Cone shaped baffle 30 has a concave inner surface 60 and a convex outer surface 62. As shown in FIG. 9, annular base 64 encircles the top of cone shaped baffle 30. Circumferential rim 66 integrally forms with annular base 64 to form the top of cone shaped baffle 30. Referring to FIG. 10, circumferential rim 66 contacts and is welded to annular chamber surface 38 to form a fluid tight seal. Circumferential rim 66 is flexibly compressed with respect to annular chamber surface 38 such that variations in tank eccentricity may be allowable without reduction in the efficacy of the present invention.

Figure 11:
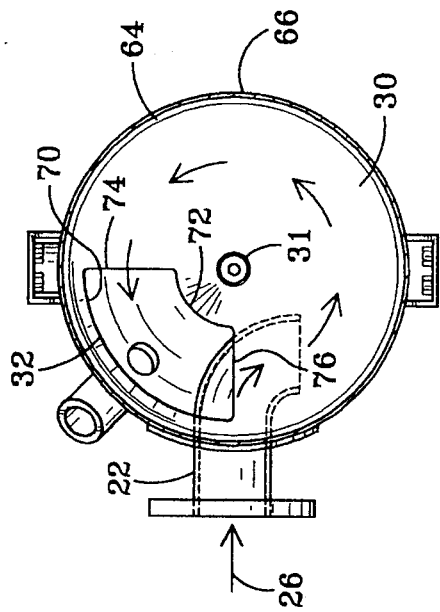
FIG. 11 is a top schematic view showing the fluid stream about the lower side of the cone shaped baffle.
Figure 12:
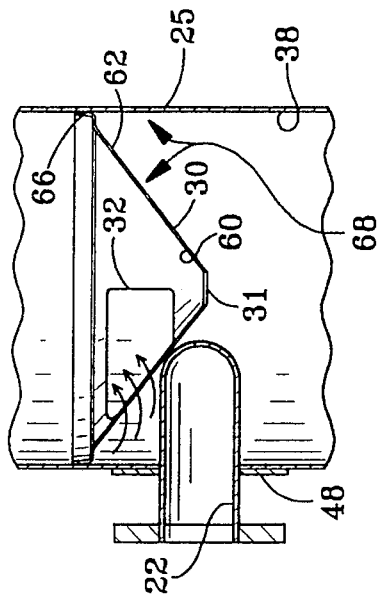
FIG. 12 is a side schematic sectional view showing the interaction of the scrubbing planes with the fluid stream.

Referring now to FIGS. 11 and 12, the flow of media entrained fluid 26 is shown. Media entrained fluid 26 enters main tank 25 through fluid inlet 22, then encircles tank 25 while contacting annular chamber surface 38 and cone shaped baffle 30 as indicated by connection planes 68. Connection planes 68 intersect at an acute angle to maximize the scrubbing area of the media entrained fluid 26 as it encircles tank 25. Connection planes 68 are alternately shown as annular chamber surface 38 and convex outer surface 62.

Referring now to FIGS. 1, 8, and more particularly FIG. 11, fluid outlet 32 is shown having a top side 70, a bottom side 72, a right side 74 and a left side 76, wherein top side 70 has a greater length than bottom side 72. Right side 74 and left side 76 are of equal length. Top side 70 and bottom side 72 each have a radial length concentric with an arc extending about circumferential rim 66. As shown in a first embodiment, radial length of top side 70 and bottom side 72 corresponds to about ninety degrees as shown. In a second embodiment as shown in FIG. 5, the radial length of top side 70 and bottom side 72 corresponds to significantly less than 90 degrees and closely approximates 45 degrees.

The foregoing is considered as illustrative only of the principles of the invention, and since numerous modifications and changes will readily occur to those skilled in the art, it is not desired to limit the invention to the exact construction and operation shown and described, and accordingly, all suitable modifications and equivalents may be resorted to, falling within the scope of the present invention.

Having described the invention, what is claimed is:

1. A mechanical fluid separator defining an interior chamber for centrifugally separating entrained media from a fluid stream, said separator comprising:

a fluid inlet connecting the interior chamber of the mechanical fluid separator with a media entrained fluid source;

an annular chamber surface defining an interior of the interior chamber, said interior chamber having a substantially closed bottom adapted to collect entrained media separated from the fluid stream;

a cone shaped baffle defining a conical surface having a concave inner portion and a convex outer portion, said conical surface defining an annular base side having a base side circumferential length and an annular apex side having an apex side circumferential length, said base side terminating in a circumferential rim contacting the annular chamber surface above the fluid inlet and wherein the circumferential rim of the base side of said conical baffle includes a ridge that is compressed when placed in contact with the annular chamber surface to uniformly contact an annular chamber surface having a variable eccentricity, said apex side terminating in an apex annular hole, wherein said apex side circumferential length is less than said base side circumferential length, said apex side located away from the bottom of said chamber; and a fluid outlet connecting the interior chamber of the mechanical fluid separator with a fluid outlet passage above the cone shaped baffle;

wherein said cone shaped baffle includes a substantially rectangular window adjacent said apex side, said window extends through the concave portion and the convex portion of the conical surface such that the fluid stream passes through the window to exit through the fluid outlet, said window having a first side adjacent said base side, a second side located away from said base, and a third side joining the first and second sides, said first side being longer than said second side, and said third window side being located at least 225 degrees from said fluid inlet.

2. The mechanical fluid separator according to claim 1 wherein said fluid inlet is a tubular member protruding into and out of the interior chamber of the mechanical fluid separator, said fluid inlet determining a path of centrifugal rotation of the fluid stream.

3. The mechanical fluid separator according to claim 2, said fluid inlet terminating in a fluid inlet orifice for directing the fluid stream in a predetermined first direction about the annular chamber surface.

4. The mechanical fluid separator according to claim 3 wherein the window is disposed in a second direction opposite said first direction of said fluid inlet such that the fluid stream is directed over three quarters of the interior circumferential distance of the annular chamber surface before entering the window passage.

5. The mechanical fluid separator according to claim 1 wherein said window also has a fourth side, said third and fourth sides being of equal dimension said fourth side also adapted to join the first and second sides of the window.

6. The mechanical fluid separator according to claim 5 wherein the first side and the side each have a radial length concentric with an arc extending about the annular base side.

7. The mechanical fluid separator according to claim 6 wherein the arc is about ninety degrees.

8. The mechanical fluid separator according to claim 6 wherein the arc is about forty-five degrees.

9. The mechanical fluid separator according to claim 1 further comprising means for defining a path of centrifugal rotation of the fluid stream about the annular chamber surface and the convex side of said cone shaped baffle.

10. A mechanical fluid separator having an interior annular chamber surface, for centrifugally separating entrained media from a fluid stream, said mechanical fluid separator comprising:

fluid inlet means for supplying the mechanical fluid separator with a media entrained fluid;

means connecting the interior chamber of the mechanical fluid separator with a fluid outlet passage;

a cone shaped baffle defining a conical surface, said conical surface defining an annular base terminating in a circumferential rim, said circumferential rim contacting the annular chamber surface between the means for supplying the entrained fluid and the means for connecting to the outlet passage and wherein the circumferential rim of the annular base of said conical baffle includes a ridge that is compressed when placed in contact with the annular chamber surface to uniformly contact an annular chamber surface having a variable eccentricity;

means for scrubbing entrained media from said fluid stream to form an unentrained fluid stream said scrubbing means comprising a first scrubbing surface formed along the interior of the annular chamber, and a second scrubbing surface formed along the conical surface, said surfaces intersecting at an acute angle; and substantially rectangular window means for passing the unentrained fluid stream through the cone shaped baffle such that the fluid stream exits through the fluid outlet said window means extending through the conical surface, said window having a first side adjacent said base side, a second side located away from said base, and a third side joining the first and second sides, said first side being longer than said second side, and said third window side being located at least 225 degrees from said fluid inlet.

11. The mechanical fluid separator according to claim 10, further comprising:

means for directing the media entrained fluid stream in a predetermined first direction about the annular chamber surface.

12. The mechanical fluid separator according to claim 11 further comprising:

means for directing the media entrained fluid stream over greater than half an exterior circumferential distance of the cone shaped baffle before encountering the window means for passing the fluid stream through the cone shaped baffle.

13. The mechanical fluid separator according to claim 12 further comprising:

means for directing the media entrained fluid stream over greater than half an interior circumferential distance of the interior annular chamber surface before encountering the window means for passing the fluid stream through the cone shaped baffle.

14. The mechanical fluid separator according to claim 11 further comprising:

means for directing the media entrained fluid stream over greater than half an interior circumferential distance of the interior annular chamber surface before encountering the window means for passing the fluid stream through the cone shaped baffle.

* * * * *